US008439592B2

(12) United States Patent
Charuel et al.

(10) Patent No.: US 8,439,592 B2
(45) Date of Patent: May 14, 2013

(54) LOCKING DEVICE WITH CATCHES AND A ROTARY LOCKING SLEEVE

(75) Inventors: Hervé Charuel, Nozay (FR); Marc Quenerch'Du, Paris (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 101 days.

(21) Appl. No.: 12/941,543

(22) Filed: Nov. 8, 2010

(65) Prior Publication Data

US 2011/0110709 A1 May 12, 2011

(30) Foreign Application Priority Data

Nov. 12, 2009 (FR) ...................................... 09 05425

(51) Int. Cl.
*F16B 7/04* (2006.01)
(52) U.S. Cl.
USPC ............ 403/351; 403/348; 403/360; 403/316
(58) Field of Classification Search .................. 285/322; 403/359.5, 359.6, 360, 316, 320, 289, 290, 403/361, 259, 310, 322.2, 371, 366, 375, 403/350–352
See application file for complete search history.

(56) References Cited

U.S. PATENT DOCUMENTS

| 2,457,523 A | | 12/1948 | Bird | |
|---|---|---|---|---|
| 2,625,415 A | * | 1/1953 | Smith | 403/289 |
| 2,636,068 A | * | 4/1953 | Perkins | 439/197 |
| 2,784,987 A | * | 3/1957 | Corcoran | 285/82 |
| 3,782,840 A | * | 1/1974 | Brishka | 403/361 |
| 4,386,689 A | * | 6/1983 | Kato | 464/36 |
| 5,350,200 A | * | 9/1994 | Peterson et al. | 285/92 |
| 2002/0008386 A1 | * | 1/2002 | Lee | 285/322 |
| 2011/0255914 A1 | * | 10/2011 | Bynum | 403/348 |

FOREIGN PATENT DOCUMENTS

| DE | 20 31 629 A1 | 12/1971 |
|---|---|---|
| WO | 00/77434 A1 | 12/2000 |

\* cited by examiner

*Primary Examiner* — Joshua Kennedy
(74) *Attorney, Agent, or Firm* — Sughrue Mion, PLLC

(57) ABSTRACT

A locking device for locking together first and second elements that are movable relative to each other in an axial direction. The device has a bushing secured to a first element and catches that are cantilevered-out in an axial direction and are elastically deformable. The device also has an anchor portion secured to a second element and an annular setback to receive hook-shaped ends of the catches. The device also has a locking sleeve mounted to move relative to the catches between a release position in which the catches are free to flex, and a blocking position in which the catches are prevented from flexing, wherein the locking sleeve is movable in rotation relative to the catches and includes a circumferential succession of gaps and of obstacles.

4 Claims, 4 Drawing Sheets

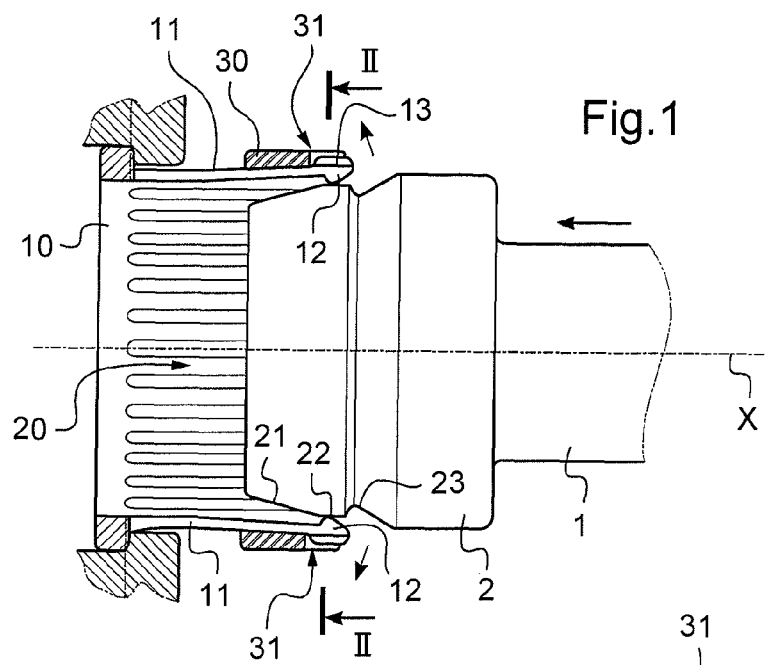
Fig.1
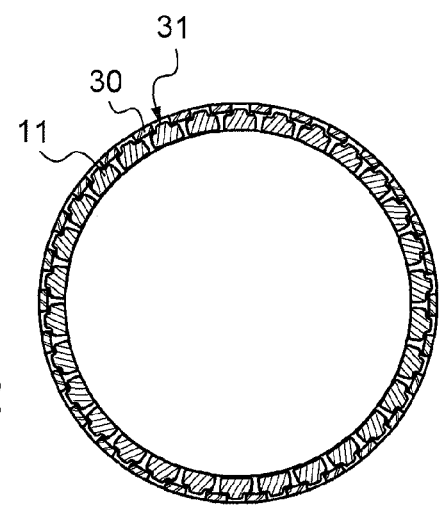
Fig.2
Fig.3
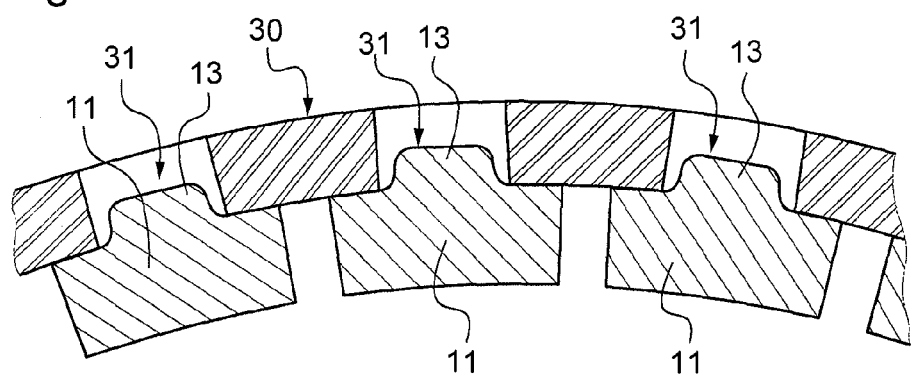

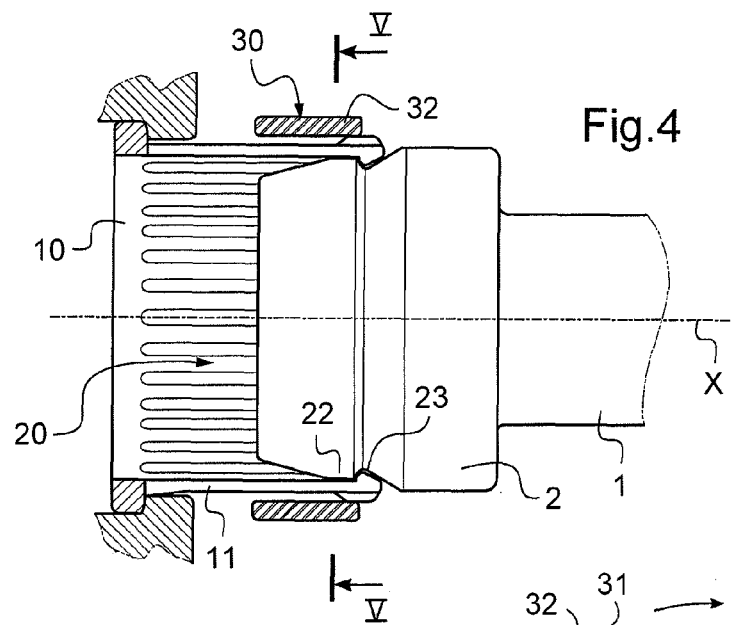
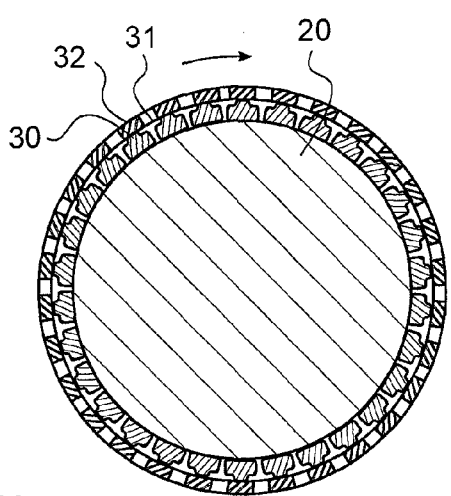
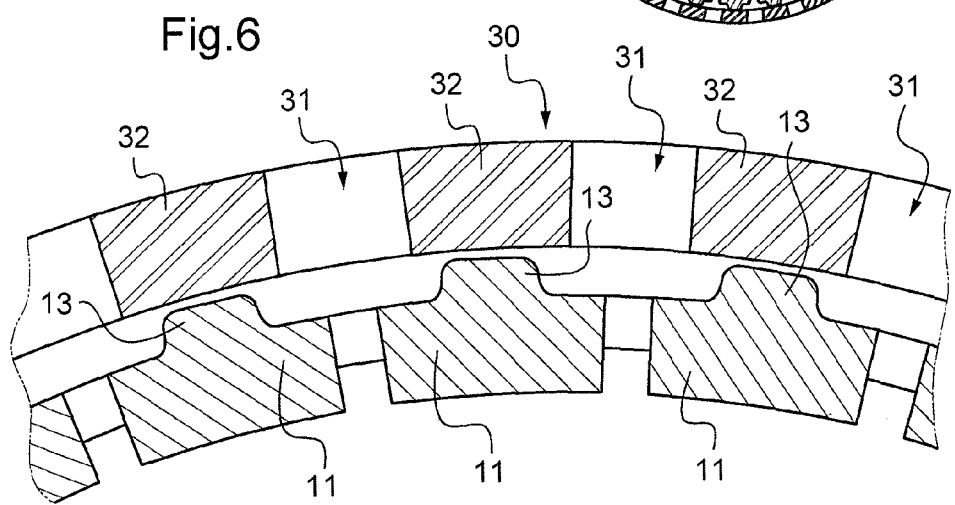

ively deformable, and secondly an anchor portion secured to
LOCKING DEVICE WITH CATCHES AND A ROTARY LOCKING SLEEVE The invention relates to a device for locking in position two elements that are movable relative to each other along an axial direction, e.g. a rod that is mounted to slide telescopically in a cylinder.

TECHNOLOGICAL BACKGROUND

Certain jacks or other telescopic actuators are fitted with a device for locking the rod in position, in particular in a retracted position or in an extended position. Locking devices are known that comprise firstly a bushing presenting some number of elastically deformable catches that are cantilevered-out in an axial direction and that are terminated by respective hooks, and secondly an anchor portion including an annular setback for receiving the hooks, the bushing and the anchor portion being mounted on two portions of the actuator that can be moved relative to each other.

For example, the bushing is placed at the end of the cylinder of the actuator, while the anchor portion is secured to the sliding rod of the actuator. The anchor portion includes a step so that when the anchor portion engages under the catches, it causes them to flex. The anchor portion then includes an annular setback to enable the catches to return to their rest position once the hooks have gone past the step, with the hooks then being engaged in the annular setback. A locking sleeve is then moved axially to cover the catches and thus prevent them deforming radially, such that the hooks are held captive in the annular setback. The rod is then locked in position.

In order to unlock the rod, it suffices to move back the sleeve so as to enable the catches to flex once more, and then to cause the anchor portion to move away from the bushing.

That type of locking is particularly effective with hydraulic actuators. The locking sleeve is itself moved by fluid under pressure, in concert with the movement of the rod, without there being any need to provide individualized control therefor. With electromechanical technology, the situation is more difficult. An example of locking using catches is given in document FR 2 895 482. In that document, the locking device is used to prevent an auxiliary rod from moving in a main rod. The locking sleeve is moved axially by means of a rotary electric motor specially provided for moving the locking sleeve, with the rotary movement thereof being transformed via a helical connection into axial movement of the locking sleeve.

OBJECT OF THE INVENTION

The invention seeks to propose a locking device with catches that is easier to integrate in a jack or actuator based on electromechanical technology.

BRIEF DESCRIPTION OF THE INVENTION

The invention provides a locking device for locking together first and second elements that are movable relative to each other in an axial direction, the device comprising firstly a bushing secured to first element and including catches that are cantilevered-out in an axial direction and that are elastically deformable, and secondly an anchor portion secured to the second element and including an annular setback to receive hook-shaped ends of the catches, the device also including a locking sleeve mounted to move relative to the catches between a release position in which the catches are free to flex, and a blocking position in which the catches are prevented from flexing.

According to the invention, the locking sleeve is movable in rotation relative to the catches and includes a circumferential succession of gaps and of obstacles, such that:

when the sleeve is in a first angular position corresponding to the release position, the gaps are in register with the catches which are therefore free to flex under the effect of the anchor portion moving; and when the sleeve is in a second angular position corresponding to the blocking position, the gaps are offset relative to the catches such that the catches are in register with the obstacles of the locking sleeve, thereby preventing the catches from flexing when their ends are engaged in the setback in the anchor portion.

Thus, when the sleeve is in the first angular position, the catches are in register with the gaps and they can therefore flex freely while the anchor portion is being engaged under the hook-shaped ends of the catches. Thereafter, once the ends of the catches have engaged in the annular setback, the sleeve is moved into the second angular position where the catches are in register with respective obstacles of the sleeve and are therefore prevented from flexing, such that the hooks can no longer escape from the angular setback of the anchor portion. The device is then locked.

BRIEF DESCRIPTION OF THE FIGURES

The invention can be better understood in the light of the following description of the figures of the accompanying drawings, in which:

FIG. 1 is a side view of a locking device in a first particular embodiment of the invention, shown before engaging the ends of the catches in the annular setback of the anchor portion, the sleeve being in the release position;

FIG. 2 is a fragmentary section view on line II-II of FIG. 1, showing the catches in the flexed position;

FIG. 3 is an enlargement of FIG. 2;

FIG. 4 is a side view of the locking device, seen after the ends of the catches have been inserted in the annular setback of the anchor portion, the sleeve being in the blocking position;

FIG. 5 is a fragmentary section view on line V-V of FIG. 4;

FIG. 6 is an enlargement of FIG. 5; and

FIGS. 6 to 10 are views similar to FIG. 1, 2, 4, 5 showing a device in a second particular embodiment of the invention.

DETAILED DESCRIPTION OF THE FIGURES

Figure 7:
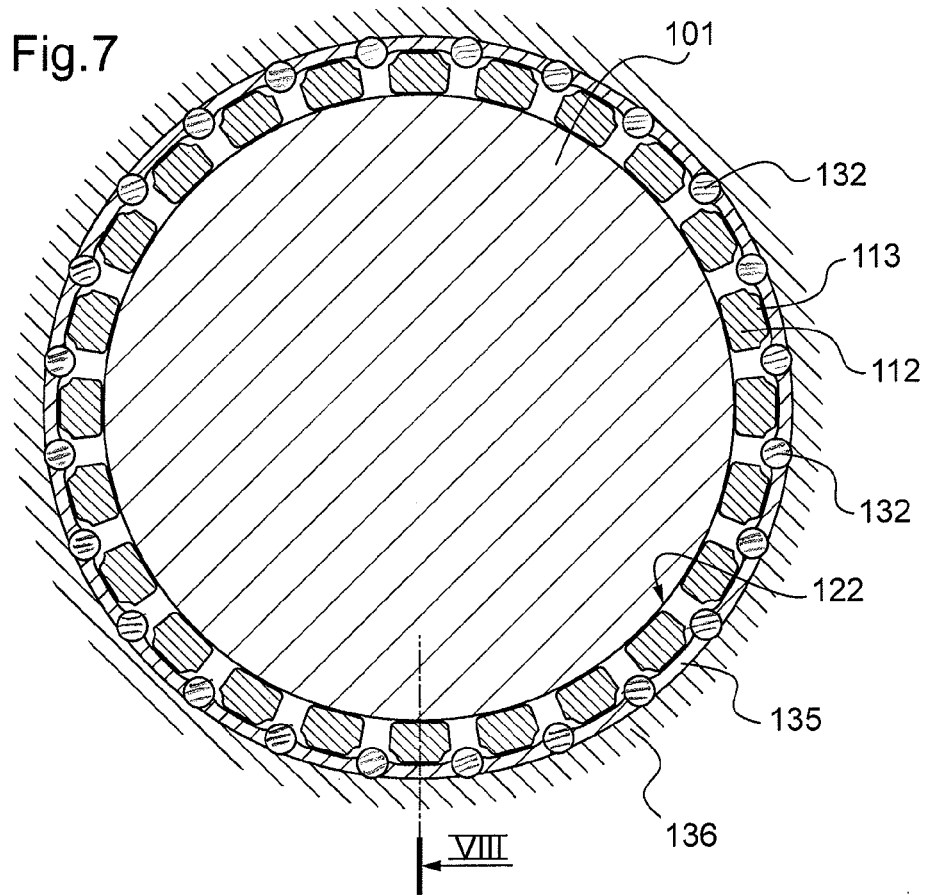

With reference to FIG. 1, the locking device of the invention is shown in an application to an actuator comprising a rod 1 having an end piston 2 mounted to slide axially along a longitudinal axis X inside a cylinder that is not shown here, for greater clarity.

The locking device of the invention comprises firstly a bushing 10 which is fastened to the end of the cylinder. The bushing 10 has a plurality of catches 11 terminated by hook-shaped ends 12. The catches 11 are advantageously obtained by machining longitudinal notches in the bushing to define a multitude of catches projecting in cantilevered-out manner from a solid portion of the bushing. The catches are elastically deformable.

The device of the invention also has an anchor portion 20, here secured to the piston 2 of the rod 1. The anchor portion 20 is generally in the form of a body of revolution and it presents successively an engagement slope 21 terminated by a step 22, followed by an annular setback 23.

Finally, the device of the invention includes a locking sleeve 30 that surrounds the bushing 10 and, in accordance with the invention, is mounted to turn in the cylinder of the actuator around the bushing 10. The locking sleeve 30 includes notches 31 that are regularly spaced apart and that can be seen more clearly in FIGS. 2 and 3. These notches serve to define two angular positions of the sleeve relative to the bushing 10. In a first angular position, referred to as the "release" position, and shown in FIGS. 1 to 3, the notches 31 are in register with the catches 11. In a second angular position, shown in FIGS. 4 to 6, the notches 31 are offset from the catches 11, such that the catches are in register with the solid portions 32 of the sleeve 30.

The operation of the locking device of the invention is as follows. With the locking sleeve initially placed in the release position, the anchor portion 20 is engaged in the bushing 10. The ends 12 come to bear against the slope 21, thereby causing the catches 11 to flex until the ends 12 come to bear against the step 22, as shown in FIG. 1. The catches 11 can flex because the catches 11 are in register with the notches 31 in the locking sleeve 30. In this position, and as can be seen in FIG. 2, the notches 31 form gaps that enable the shoes 13 that project from the back of each of the catches 11 to retract by penetrating into the facing notch 31. This position of the locking sleeve 30 is the release position.

Thereafter, once the anchor portion 30 has advanced further, the ends 12 of the catches 11 drop into the annular setback 23, thereby allowing the catches 11 to return to their rest position, as shown in FIG. 4. In the invention, the locking sleeve 30 is pivoted from the FIG. 2 position to the FIG. 5 position such that the notches 31 are offset from the catches 11 and such that the shoes 13 on the catches are in register with solid portions 32 of the locking sleeve 30. This prevents the catches 11 from flexing because the solid portions 32 form obstacles, such that the ends 12 of the catches 11 are held captive in the annular setback 23, thereby locking the rod 1 in position. This position of the locking sleeve 30 is a blocking position.

In order to release the rod, it suffices to turn the locking sleeve 30 so as to return to the release position of FIG. 2. Thus, the catches 11 can once more flex so that the hook-shaped ends 12 can leave the annular setback 23.

Figure 8:
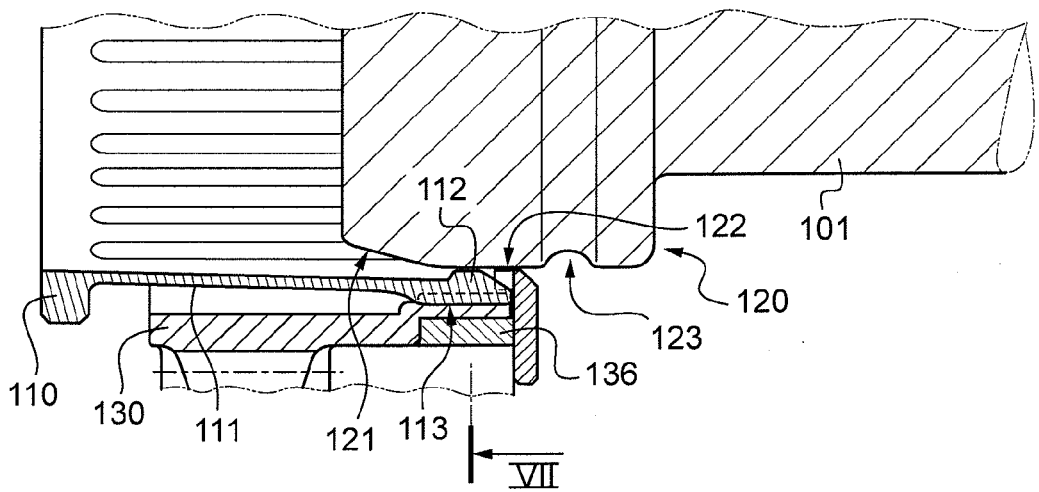
Figure 9:
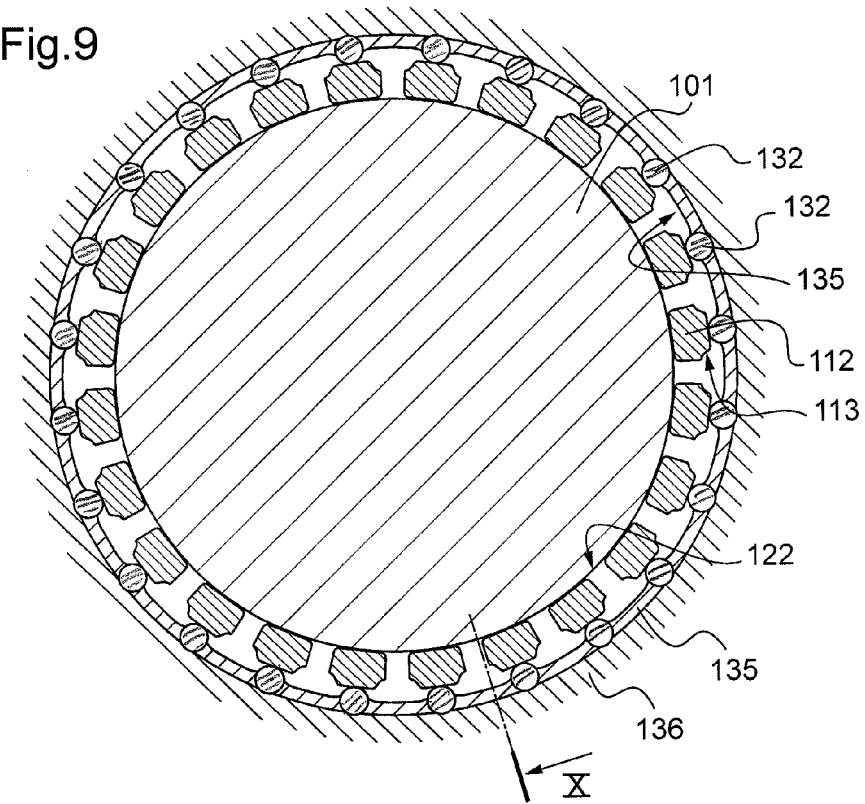
Figure 10:
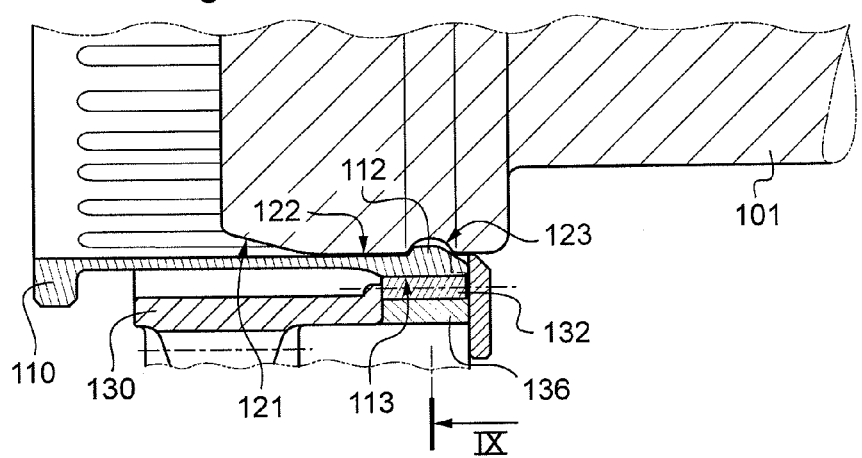

In a second embodiment shown in FIGS. 7 to 10, and in which the references for elements that are common with those of the above-described embodiments have one hundred added thereto, the sleeve 130 comprises an annular portion 135 that extends in register with shoes 113 of the catches 111 and that is regularly hollowed out so as to form receptacles for receiving rollers 132. The rollers 132 run on an annular track 136 while the sleeve 130 is turning between the release position and the blocking position. Thus, the gaps are now formed by the spaces 131 between two consecutive rollers 132, while the rollers 132 form obstacles co-operating with the shoes 113 of the catches 111 to prevent them from flexing when the sleeve 132 is in the blocking position. In FIGS. 7 and 8, the sleeve 132 is in the release position. The catches 111 flex on going past the step in the anchor portion 120, moving into the gaps 131 that extend between pairs of consecutive rollers. In FIGS. 9 and 10, the anchor portion 120 has moved forwards, such that the hooks of the catches have penetrated into the setback 123 of the anchor portion 120. The sleeve 130 is shown pivoted into the position in which the rollers 132 prevent the catches from flexing.

Thus, the catches are locked and released by means of a pivoting sleeve, which is very easily moved by means of a rotary electromechanical device, thereby avoiding any transformation between rotary and longitudinal movements as shown in document FR 2 895 482. For example, the locking sleeve may be fitted with permanent magnets such that the sleeve itself constitutes the rotor of an electric stepper motor. In addition, the locking sleeve may always be turned in the same direction, since the regular circumferential arrangement of the gaps and of the obstacles defines an alternating succession of release angular positions and of blocking angular positions.

The invention is not limited to the above description, but on the contrary covers any variant coming within the ambit defined by the claims. In particular, the invention covers any locking device in which the sleeve comprises a circumferential succession of gaps and obstacles, the obstacles being constituted by the solid portions in the first embodiment or by the rollers in the second embodiment, or by other means, e.g. such as balls.

In addition, although in the example shown the anchor portion engages inside the bushing so that the hook-shaped ends of the catches face inwards, the invention applies equally well to a locking device in which the anchor portion is annular and engages on the outsides of the catches so that the hook-shaped ends of the catches are turned outwards. Under such circumstances, the locking sleeve no longer extends around the catches, but rather inside them.

Finally, although in the examples shown, the bushing carrying the catches and the sleeve are secured to a common element (specifically the cylinder of the actuator), the sleeve could be secured to some other element. Similarly, although in the above description the sleeve turns relative to the first element while the bushing remains stationary on the first element, the reader will readily understand that what matters is the ability for the bushing carrying the catches to turn relative to the sleeve so as to go from the release position to the blocking position once the ends of the catches have penetrated into the annular setback in the anchor portion.

What is claimed is:

1. An apparatus comprising:
   first and second elements moveable relative to each other in an axial direction;
   a locking device for locking together said first and second elements, the locking device comprising
   (1) a bushing secured to the first element and including catches that are cantilevered-out in an axial direction and that are elastically deformable,
   (2) an anchor portion secured to the second element and including an annular setback to receive hook-shaped ends of the catches, said annular setback being a notch formed into a surface of the anchor portion and extending circumferentially around the anchor portion, and
   (3) a locking sleeve comprising a circumferential succession of gaps and of obstacles, and being mounted to move relative to the catches between a release position in which the catches are free to flex, and a blocking position in which the catches are prevented from flexing,
   wherein the locking sleeve moves from the release position to the blocking position only by a rotational movement of the locking sleeve relative to the catches, such that:
      when the sleeve is in a first angular position corresponding to the release position, the gaps are in register with the catches which are therefore free to flex under the effect of the anchor portion moving and can readily enter and exit the annular setback; and
      when the sleeve is in a second angular position corresponding to the blocking position, a portion of the catches is within the annular setback and the gaps are offset relative to the catches such that the catches are in register with the obstacles of the locking sleeve, thereby preventing the catches from flexing when their ends are engaged in the setback in the anchor portion and cannot exit the annular setback.

2. A device according to claim 1, wherein the obstacles of the sleeve are full portions thereof.

3. A device according to claim 1, wherein the obstacles of the sleeve are rollers received in housings defined by open portions of the sleeve.

4. A device according to claim 1, wherein the sleeve is mounted to move in rotation on the first element, while the bushing is stationary relative to the first element.

* * * * *